United States Patent
Parkes et al.

(10) Patent No.: US 10,234,578 B2
(45) Date of Patent: Mar. 19, 2019

(54) METHODS AND SYSTEMS TO OPERATE MARINE SOURCES TO AVOID AIR IN WATER EFFECTS

(71) Applicant: PGS Geophysical AS, Oslo (NO)

(72) Inventors: Gregg Parkes, Surrey (GB); Stian Hegna, Lysaker (NO); Francis Drossaert, Surrey (GB)

(73) Assignee: PGS Geophysical AS, Oslo (NO)

( * ) Notice: Subject to any disclaimer, the term of this patent is extended or adjusted under 35 U.S.C. 154(b) by 564 days.

(21) Appl. No.: 14/586,506

(22) Filed: Dec. 30, 2014

(65) Prior Publication Data

US 2016/0047922 A1 Feb. 18, 2016

Related U.S. Application Data

(60) Provisional application No. 62/037,230, filed on Aug. 14, 2014.

(51) Int. Cl.
| | | |
|---|---|---|
| *G01V 1/02* | (2006.01) | |
| *G01V 1/24* | (2006.01) | |
| *G01V 1/137* | (2006.01) | |
| *G01V 1/38* | (2006.01) | |
| *G01V 1/387* | (2006.01) | |

(52) U.S. Cl.
CPC ............ *G01V 1/137* (2013.01); *G01V 1/38* (2013.01); *G01V 1/387* (2013.01)

(58) Field of Classification Search
CPC .. G01V 1/364; G01V 1/38; G01V 2210/3246; G01V 1/137; G01V 1/36; G01V 1/3808; G01V 1/387; G01V 2210/52; G01V 2210/56; G01V 1/005; G01V 1/288; G01V 2210/647; G01V 2210/65; G01V 3/083; G01V 3/12; G01S 15/60
USPC ........... 702/6, 14, 17; 367/14, 15, 23, 39, 91
See application file for complete search history.

(56) References Cited

U.S. PATENT DOCUMENTS

| | | | |
|---|---|---|---|
| 3,676,841 A | 7/1972 | Anstey | |
| 4,242,740 A | 12/1980 | Ruehle | |
| 4,458,339 A | 7/1984 | Wason | |
| 5,050,133 A * | 9/1991 | Buddery | G01S 15/60 367/91 |
| 2010/0124148 A1* | 5/2010 | Kluver | G01V 1/36 367/24 |
| 2010/0149912 A1 | 6/2010 | Yang et al. | |
| 2012/0014212 A1 | 1/2012 | Eick et al. | |
| 2012/0014213 A1 | 1/2012 | Eick et al. | |

OTHER PUBLICATIONS

Search Report under Section 17(5), Application No. GB1514132.8, dated Jan. 14, 2016.

* cited by examiner

*Primary Examiner* — John H Le

(57) ABSTRACT

In order to avoid complicated and unpredictable effects on the wavefields emitted by air guns activated at different times, methods and systems of the current disclosure are directed to computationally designing a sequence for activating subsets of air guns in a time distributed manner that minimizes the effects of air in the water surrounding the source. The sequence may be used with discrete and continuously recorded marine surveys.

31 Claims, 16 Drawing Sheets

METHODS AND SYSTEMS TO OPERATE MARINE SOURCES TO AVOID AIR IN WATER EFFECTS

CROSS-REFERENCE TO A RELATED APPLICATION

This application claims the benefit of Provisional Application 62/037,230, filed Aug. 14, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged marine sources. One type of marine source often used in marine surveys is composed an array of air guns. An acoustic signal may be generated by simultaneously activating the air guns. The air guns generate separate pressure wavefields that combine to form a total pressure wavefield. This wavefield is an acoustic signal that radiates outward in all directions. A portion of the wavefield travels directly from the source through the body of water and into the subterranean formation, and a portion of the wavefield travels upward to the free surface before being reflected downward from the free surface to the subterranean formation. The reflected portion of the wavefield is called the "source ghost" because the reflected portion is time-delayed and travels behind the direct portion of the wavefield. At each interface between different types of rock or sediment of the subterranean formation a portion of the source wavefield energy is refracted, a portion is transmitted, and a portion is reflected back toward the formation surface and into the body of water. A typical marine survey is carried out with a survey vessel that passes over the illuminated subterranean formation while towing elongated cable-like structures called streamers. The streamers may be equipped with a number of collocated, pressure and particle motion sensors that measure the response of the subterranean formation to the direct and source ghost components of the source wavefield. The pressure sensors generate seismic data that represents the pressure wavefield reflected from the subterranean formation and the particle motion sensors generate seismic data that represents the particle motion, particle velocity, or particle acceleration wavefield reflected from the subterranean formation. The survey vessel receives and records the seismic data generated by the sensors.

The seismic data is processed with seismic data processing techniques that depend on highly accurate estimates of the source wavefield in order to effectively remove source wavefield effects from the seismic data and ultimately generate high-resolution seismic images of the subterranean formation. Any errors in an estimate of the source wavefield lowers the signal to noise ratio and general quality of the seismic images. When the air guns of a source array towed behind a vessel are simultaneously activated, air bubbles created by the air guns in previous activations do not substantially affect estimates of the source wavefield from the current activation, because the air-bubbles remaining in the water from previous activations are behind the current position of the source due to forward motion of the source. On the other hand, when the air guns within a source array towed behind a vessel are activated at different times with short time intervals (e.g., a few seconds or less), the water column surrounding a next to be activated air gun may be filled with air bubbles created by one or more neighboring, previously activated air guns. The air-bubbles create very complex and unpredictable effects on the wavefield emitted by the next to be activated air gun. As a result, an estimate of a source wavefield may not accurately characterize the source wavefield generated by the air guns.

DETAILED DESCRIPTION

In order to avoid complicated and unpredictable effects on wavefields emitted by air guns of a source that are activated in a time-distributed manner, methods and systems described herein generate a sequence in which subsets of air guns activated at different times in the order provided by the sequence minimizes adverse effects of air in the water produced by previously activated air guns. In one aspect, an array of air guns comprising a source is partitioned into subsets of air guns called "sub-sources." A sub-source may consist a single air gun, a group of air guns, or a sub-array of air guns. Methods and systems generate a sequence that represents an order in which the sub-sources are to be activated in a time-distributed manner. The sequence is generated based on the arrangement of air guns comprising each sub-source, speed of the vessel towing the source, and expected air bubble contamination of source wavefields generated by the sub-sources. When the sub-sources are activated in a time-distributed manner according to the order represented by the sequence, adverse interactions between air bubbles generated by previously activated sub-sources and a source wavefield to be generated by a next to be activate sub-source in the sequence are minimized.

Figure 1A:
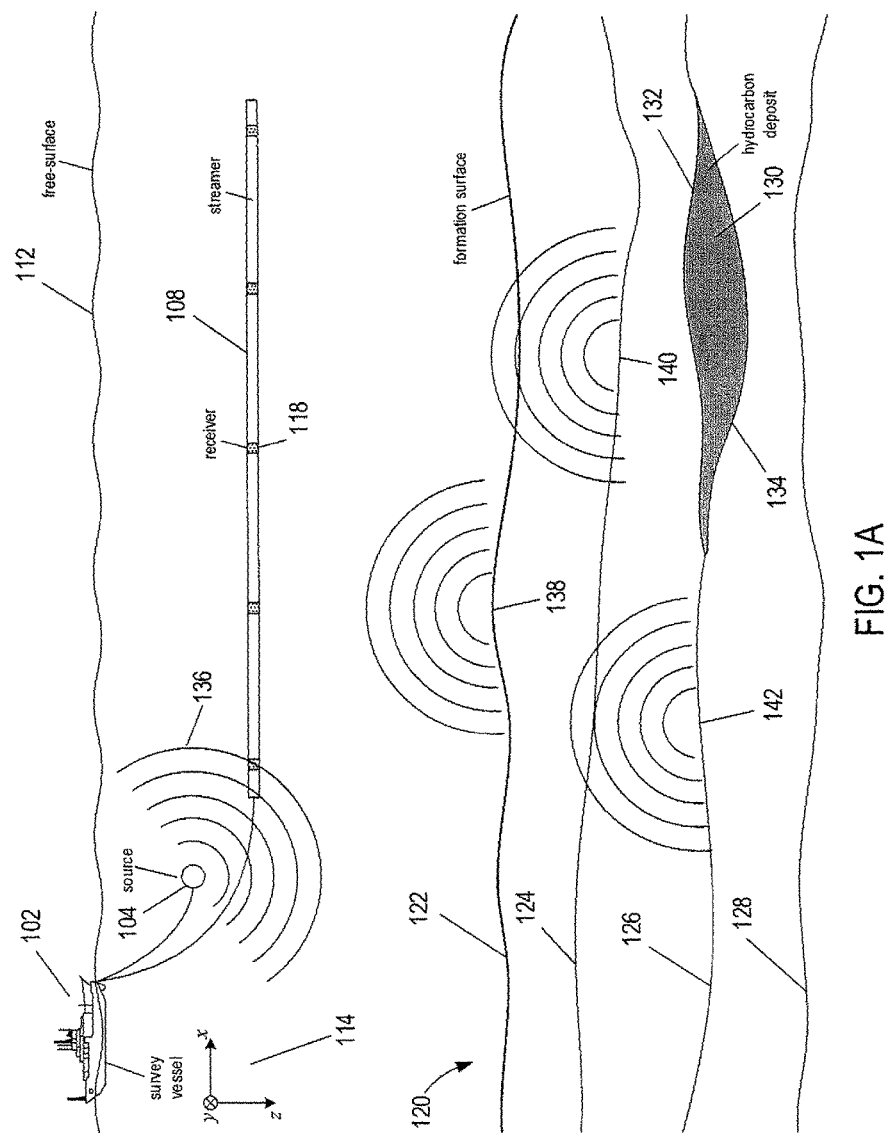
FIGS. 1A-1B show side-elevation and top views of an example seismic data acquisition system.
Figure 1B:
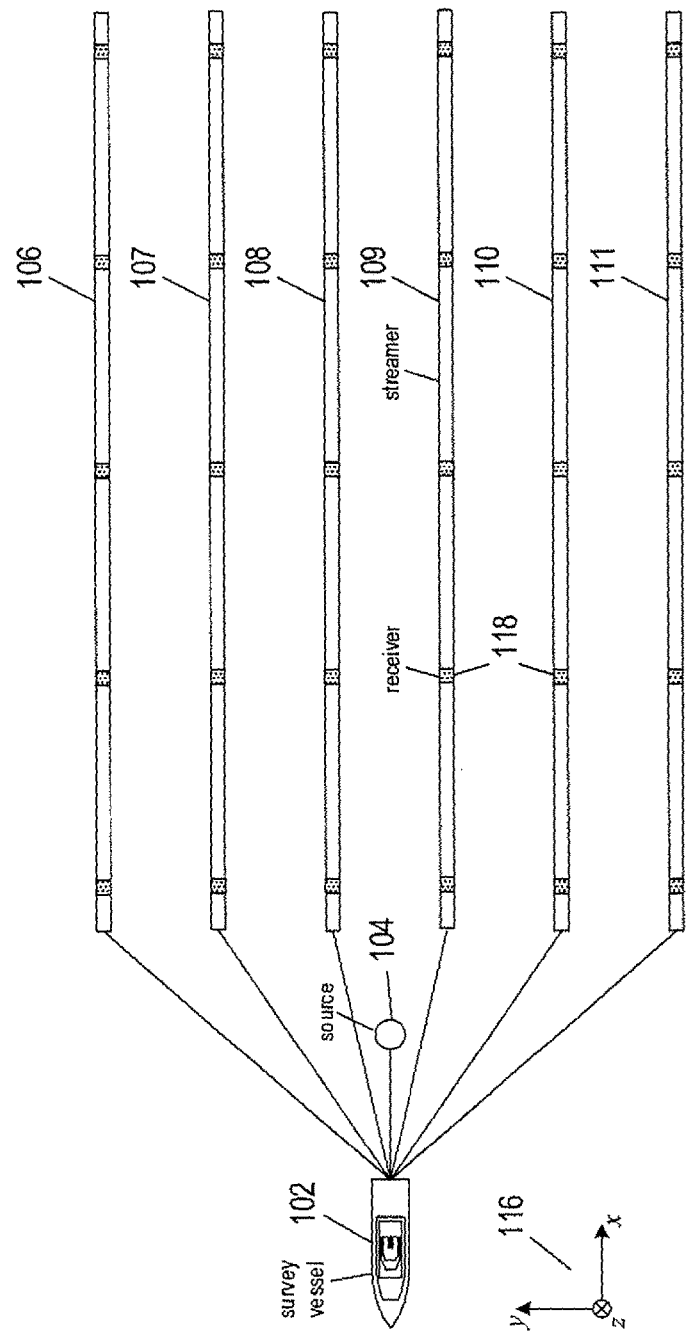

FIGS. 1A-1B show side-elevation and top views, respectively, of an example seismic data acquisition system composed of a survey vessel 102 towing a source 104 and six separate streamers 106-111 beneath a free-surface 112 of a body of water. The body of water may be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free-surface 112. However, in practice, the data acquisition surface may be smoothly varying, for example, due to active sea currents and weather conditions. In other words, although the streamers 106-111 are illustrated in FIGS. 1A and 1B and subsequent figures as straight and substantially parallel to the free-surface 112, in practice, the towed streamers may undulate as a result of dynamic conditions of the body of water in which the streamers are submerged. A data acquisition surface is not limited to having a planar horizontal orientation with respect to the free-surface 112. The streamers may be towed at depths that angle the data acquisition surface with respect to the free-surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more survey vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free-surface 112 and is referred to as the "cross-line" direction. The z-direction specifies the position of a point perpendicular to the xy-plane (i.e., perpendicular to the free-surface 112) with the positive z-direction pointing downward away from the free-surface 112. The streamers 106-111 are generally long cables containing power and data-transmission lines that connect receivers represented by shaded rectangles 118 spaced-apart along the length of each streamer to seismic data acquisition system and data-storages devices located on board the survey vessel 102.

Streamer depth below the free-surface 112 may be estimated at various locations along the streamers using depth measuring devices attached to the streamers. For example, the depth measuring devices can measure hydrostatic pressure or utilize acoustic distance measurements. The depth measuring devices may be integrated with depth controllers, such as paravanes or water kites that control and maintain the depth and position of the streamers as the streamers are towed through the body of water. The depth measuring devices are typically placed at intervals (e.g., about 300 meter intervals in some implementations) along each streamer. Note that in other implementations buoys may be attached to the streamers and used to help maintain the orientation and depth of the streamers below the free-surface 112.

FIG. 1A shows a cross-sectional view of the survey vessel 102 towing the source 104 above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine survey. As the survey vessel 102 moves over the subterranean formation 120, the source 104 is activated to produce an acoustic signal (often referred to as a "shot") at spatial and/or temporal intervals. In other implementations, the source 104 may be towed by one survey vessel and the streamers may be towed by a different survey vessel. The source 104 is composed of an array of air guns described below. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 eventually reaches the formation surface 122, at which point it is partially reflected from the formation surface 122 and partially refracted downward into the subterranean formation 120, becoming elastic waves within the subterranean formation 120. In other words, in the body of water, the acoustic signal is composed of compressional pressure waves, or P-waves, while in the subterranean formation 120, the waves include both P-waves and transverse waves, or S-waves. Within the subterranean formation 120, at interfaces between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively called the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the source wavefield and reflected wavefield in response to the source wavefield and the subterranean formation may be functions of distance from the source 104 as well as the materials and physical characteristics of the materials through which the wavefields travel. In addition, the expanding wavefronts may be altered as the wavefronts propagate through the subterranean formation and cross interfaces and as the velocity of sound varies in the media traversed by the waves. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration geophysicists.

In practice, only a portion of the source wavefield directed downward and a portion of the source wavefield reflected from the free-surface actually produces a response from the subterranean formation. The direct downward portion of the source wavefield travels within a cone of emission that opens downward. The free-surface reflected portion of the source wavefield travels within an upward cone of emission that opens upward. The downward and upward cones of emission share a common apex centered on the source, share the same central axis directed perpendicular to the formation surface, and have the same cone angle less than 90 degrees. The upward cone of emission creates a second downward cone of emission with the direct downward cone of emission located entirely within the second downward cone of emission of emission crated by the reflection from the free surface. The angle of the boundary of the cone of emission is defined by the critical angle of incidence on the formation surface, which may be calculated from the law of refraction:

$$\frac{\sin\theta_s}{v_s} = \frac{\sin\theta_w}{v_w} \qquad (1)$$

where $v_w$ is the speed of sound in water (e.g., about 1500 m/s);
$\theta_w$ is the angle of incidence with respect to normal;
$v_s$ is the speed of sound in sediment of the subterranean formation; and
$\theta_s$ is the angle of refraction at an interface.

The critical angle of incidence $\theta_c$ occurs when $\theta_s=90°$ in Equation (1):

$$\theta_c = \theta_w = \sin^{-1}\left(\frac{v_w}{v_s}\right) \qquad (2)$$

Acoustic energy incident on the subterranean formation at angles greater than the critical angle are reflected from the subterranean formation surface back into the body of water. By contrast, acoustic energy incident on the subterranean formation at angles less than the critical angle are transmitted into the subterranean formation. Therefore, energy outside the cone of emission does not contribute to the recorded seismic data.

Figure 2:
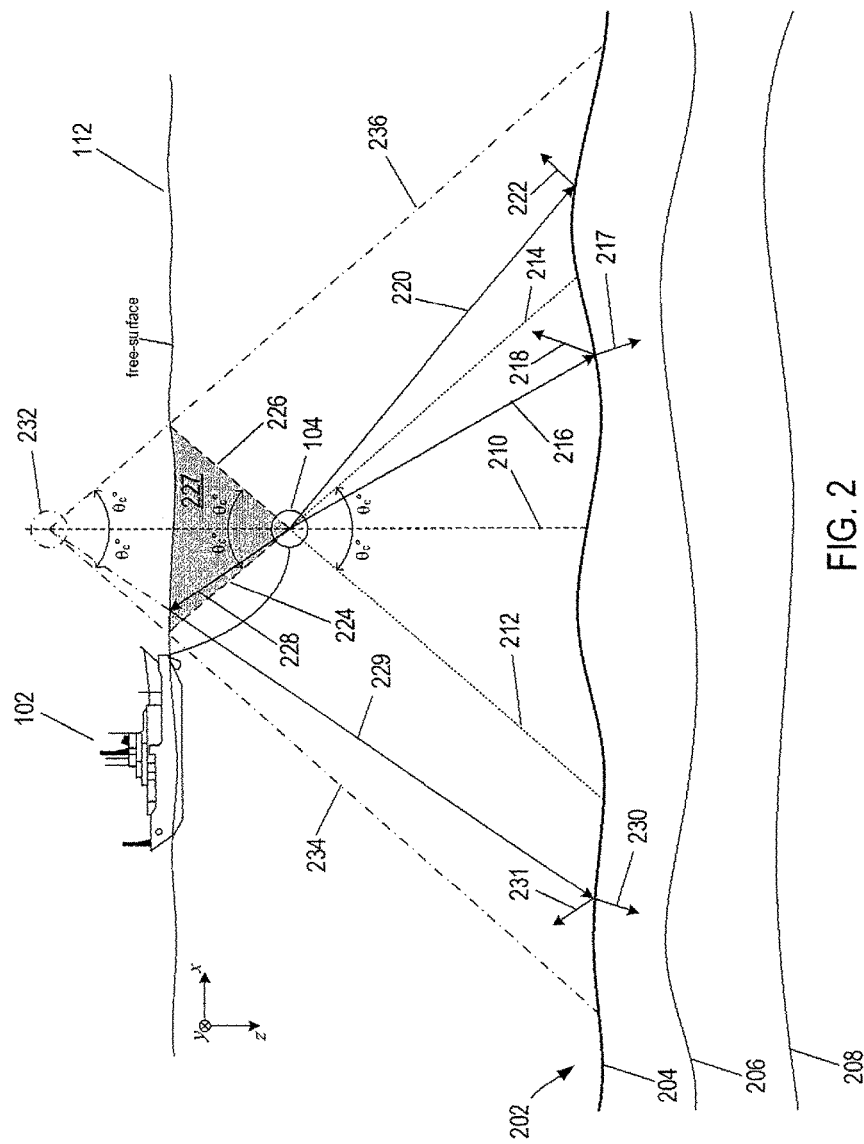
FIG. 2 shows a side elevation view of a survey vessel, source and a cross-sectional view of cones of emission.

FIG. 2 shows a magnified, side elevation view of the survey vessel 102 and source 104 and a cross-sectional view of downward and upward cones of emission for the source 104 above a subterranean formation 202. In FIG. 2, curve 204 represents the surface of subterranean formation 202 and curves 206 and 208 represent interfaces between subterranean layers of different compositions within the subterranean formation 202. Dashed line 210 represents a cone central axis directed perpendicular to the formation surface 204. The cone angle of the downward and upward cones of emission for the source 104 is the critical angle of incidence with respect to the axis 210, which according to Equation (2) depends on the speed at which sound travels in the top layer of the subterranean formation 202. In the example of FIG. 2, the cone angle is the critical angle denoted by $\theta_c$. Dotted lines 212 and 214 represent edges of a direct downward cone of emission that opens downward with a cone angle $\theta_c$. The portion of the source wavefield 104 with angles of incidence less than $\theta_c$ are transmitted into, and reflected from, the subterranean formation as represented by rays 216-218. On the other hand, portions of the source wavefield that travels directly from the source 104 to the formation surface 204 outside the cone angle of $\theta_c$ are reflected from the formation surface 204 as represented by rays 220 and 222. Dashed lines 224 and 226 represent edges of an upward cone of emission that opens upward with the same cone angle $\theta_c$. In this case, the portion of the source wavefield 104 that is incident on the free-surface 112 with angles of incidence less than $\theta_c$, represented by shaded region 227, are reflected back down and into to the subterranean formation 202, as represented by rays 228-231. Portions of the source wavefield incident on the free surface outside the cone angle $\theta_c$ are reflected from the formation surface 204. As shown in FIG. 2, dot-dashed circle 232 and dot-dashed lines 234 and 236 represent a virtual source and virtual cone of emission. The reflected portion of the source wavefield from free-surface 112 appears to have been generated by the virtual source 232 located the same distance above the free-surface 112 as the actual source 104 is located below the free-surface 112. Both the upward and downward cones of emission have an apex at the source 104 and are contained within the downward cone of emission with an apex at the virtual source 232. The downward cone of emission defined by dotted lines 212 and 214 is called an inner cone of emission, and the downward cone of emission defined by dot-dashed lines 234 and 236 is called an outside cone of emission. The outside cone of emission is the limiting cone that defines a three-dimensional cone that should be free of air when activating air guns as described below. The height of the outside cone of emission is the distance from the virtual source 232 to the formation surface 204.

Figure 3:
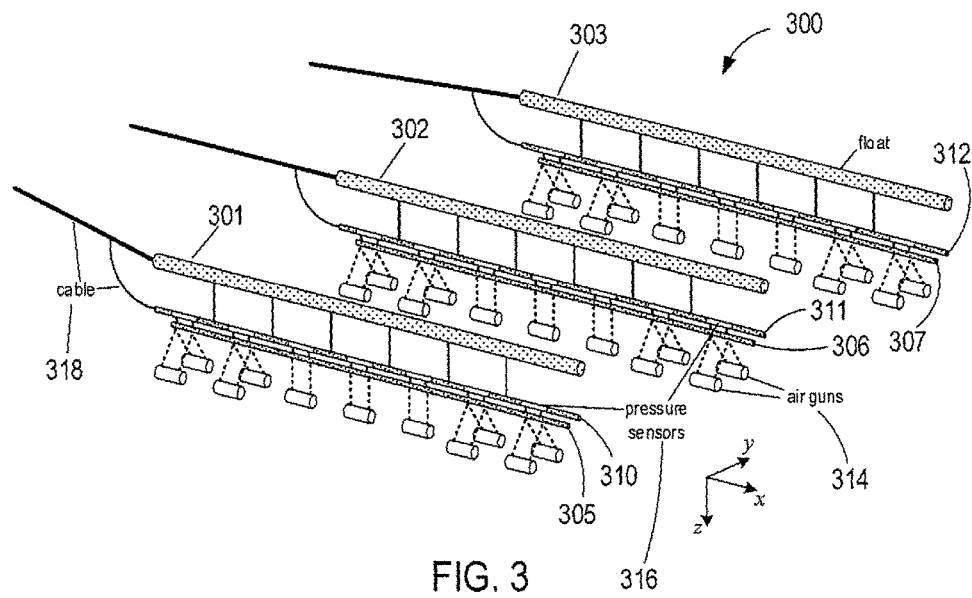
FIG. 3 shows an isometric view of an example source.
Figure 4:
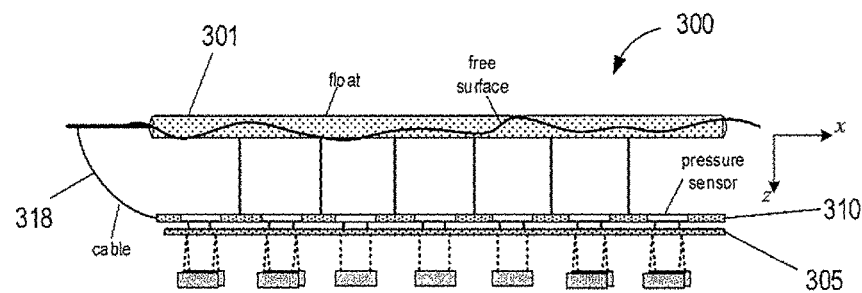
FIG. 4 shows a side elevation views of the example source shown in FIG. 3.

The source 104 is implemented as an array of air guns. FIG. 3 shows an isometric view of an example source 300 and FIG. 4 shows a side elevation view of the source 300. The source 300 includes three separate floats 301-303 and three corresponding rods 305-307 and pressure sensing rods 310-312 are suspended between the floats 301-303 and the rods 305-307. Eleven air guns, such as air guns 314, are suspended from each of the rods. Each pressure sensing rod includes seven pressure sensors, such as pressure sensors 316, connected to data transmission cables, such as data transmission cable 318 that transmit activation signals to each of the air guns and transmit pressure sensor data to a survey vessel that tows the source 300.

Note that a source is not intended to be limited to the example thirty-three air gun array shown in FIG. 3. In practice, seismic sources may be configured with one or more floats and each float may have any number of air guns suspended from the float. For example, a source may have up to 80 or more air guns. Also, a source may include a frame or structure (not shown in FIG. 3) that maintains the relative locations of the air guns within the source and prevents the floats and rods from drifting apart or together while the source is towed through a body of water by a survey vessel. In other words, the air guns are in substantially fixed locations while the source is towed through a body of water.

Figure 5:
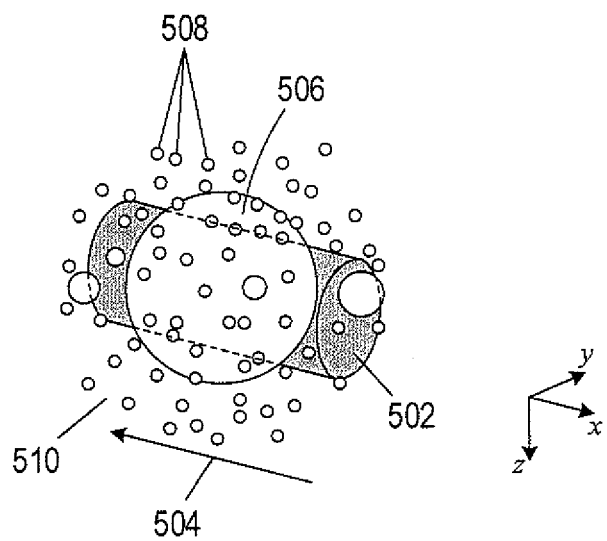
FIG. 5 shows a snapshot of an air gun during activation.

FIG. 5 shows a snapshot of an air gun 502 during activation while the air gun travels in a direction 504 at vessel speed. As the air gun is activated, air is rapidly forced out through one or more openings located on an end, or along the side, of the air gun 502 forming a complex combination of large bubbles, such as large bubble 506, and many smaller bubbles 508 forming a foam of air 510 around the larger bubbles. High pressure in the bubble 506 generates acoustic pressure waves that radiate outward. In other words, when the bubble 506 is injected into the water from the air gun 502 there is a radial displacement of water from the center of the bubble 506 and a pressure disturbance propagates outward. As the bubble 506 expands the pressure of the air in the bubble 506 drops below that of the surrounding fluid, but inertia causes the bubble 506 to over expand so that the air pressure in the bubble 506 is less than the pressure of the surrounding water. Then the greatly expanded bubble 506 contracts due to the pressure of the surrounding water. This process of expansion and contraction continues with the bubble 506 oscillating through many cycles with pressure waves radiating outward into the water. The amplitude of the pressure wave decreases with time.

Figure 6:
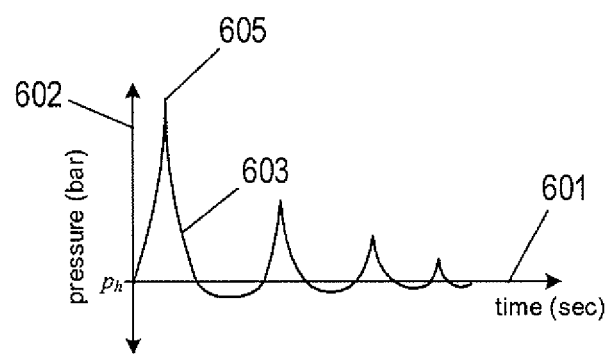
FIG. 6 shows a plot of an example near-field signature of an air gun.

FIG. 6 shows a plot of an example near-field signature of an air gun measured by a pressure sensor located in close proximity to the air gun. Horizontal axis 601 represents time, vertical axis 602 represents pressure and curve 603 represents the near-field signature of the pressure wave emitted from the air gun. The near-field signature 603 represents changes in the pressure amplitude of the bubble output from the air gun. First peak 605 corresponds to the initial build-up and release of pressure in a bubble output from the air gun into the water, after which, subsequent peaks represent a decrease in amplitude with increasing time. The near-field signature reveals that the pressure falls below the hydrostatic pressure, $p_h$, between peaks. The bubble oscillation amplitude decreases as time passes and the bubble period of oscillation is not constant from one cycle to the next. In other words, the bubble motion is not simple harmonic motion. The chamber volume of an air gun determines the associated near-field signature, which is also influenced by the pressure waves created by other air guns of the same source. In general, the larger the chamber volume the larger the peak amplitudes and the longer the bubble periods of the associated near-field signatures.

Figure 7:
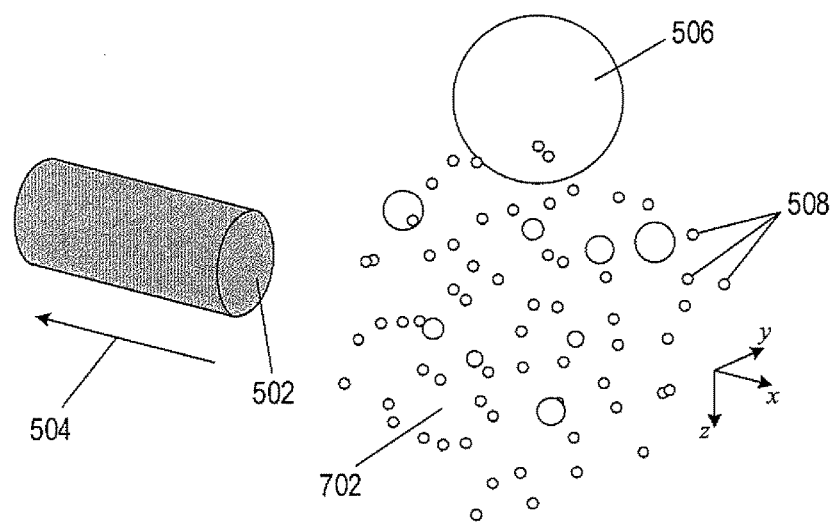
FIG. 7 shows a snapshot of an air gun a short time after activation.

FIG. 7 shows a snapshot of the air gun 502 and bubbles a short time after the activation depicted in FIG. 5. As the air gun 502 continues to move in the direction 504, the larger bubble 506 rises through the water faster than the smaller bubbles 508. The water creates drag that essentially stops the bubbles 506 and 508 from moving forward behind the air gun 502. Over time the foam 510 in FIG. 5 expands to fill a larger air/water volume 702 with many of the smaller bubbles 508 remaining in the volume 702 around and above the location where the air gun 502 was activated.

The pressure waves output from the air guns combine to form a source wavefield, which is the acoustic signal that illuminates a subterranean formation as described above with reference to FIGS. 1-3. The air guns within source arrays may be selected with different chamber volumes, spacings, and positions in order to generate a desirable source wavefield.

Figure 8:
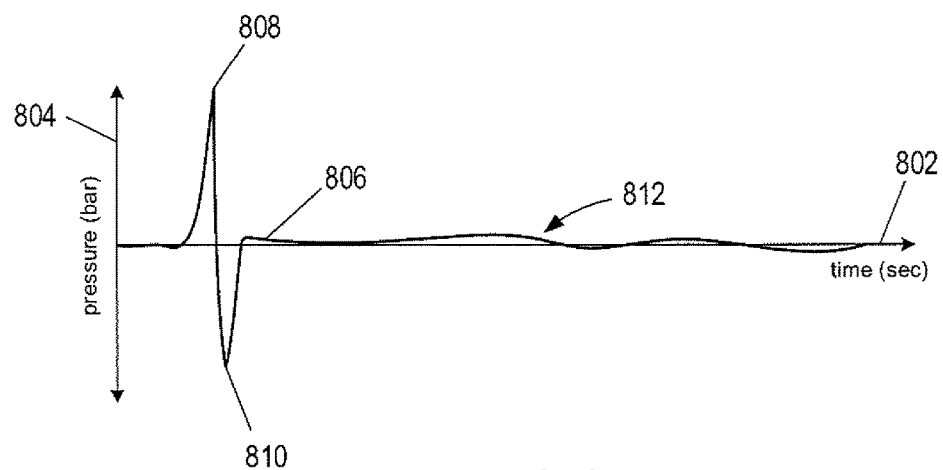
FIG. 8 shows an example plot of a far-field source signature of an acoustic signal.

FIG. 8 shows an example plot of the source wavefield in the vertical direction. Horizontal axis 802 represents time, vertical axis 804 represents pressure and curve 806 represents a resulting far-field amplitude of the source wavefield, for the case in which all the air guns in the array are fired simultaneously. The far-field amplitude 806 has a large primary peak 808 and a ghost peak 810 followed in time by very small amplitude oscillations 812. The primary peak 808 represents the portion of the source wavefield that travels directly to the subterranean formation while the ghost peak 810 represents the portion of the source wavefield that is reflected from the free surface and is responsible for source ghost contamination of the wavefields measured by the receivers 118 (FIG. 1).

A source wavefield created by simultaneously activating the air guns of a moving source array are not adversely affected by air bubbles created by previous simultaneous activations of the source array because the air-bubbles from previous activations remain at the location where the source array was previously activated. On the other hand, when the air guns of a moving source array are activated at different times within a short time interval (e.g., a few seconds or less), the water column surrounding a next to be activated air gun may be filled with air bubbles caused by one or more neighboring air guns that were activated at earlier times. The air-bubbles create very complex and unpredictable effects on the wavefield emitted by the air gun to be activated next. Some of these effects may be related to the complexity of the medium caused by the mixture of air bubbles and water, with air bubbles of different sizes and large density and velocity contrasts between air and water, causing scattering, attenuation and propagation effects. As a result, this component of the source wavefield becomes unpredictable variable and chaotic.

Figure 9A:
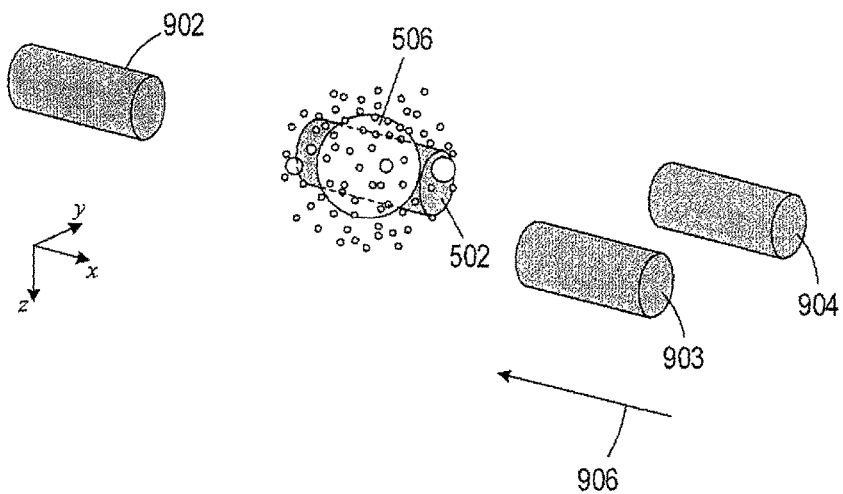
FIG. 9A shows an activated air gun surrounded by three other air guns.
Figure 9B:
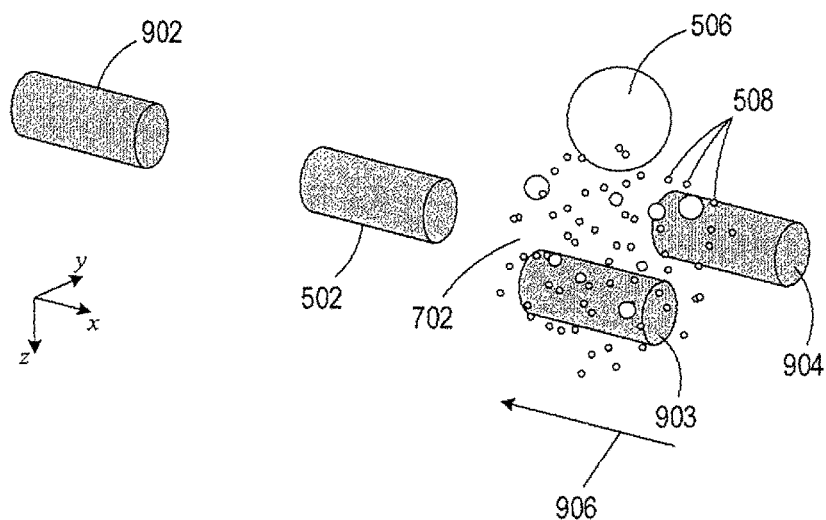
FIG. 9B shows two air guns passing through air bubbles created by a previously activated air gun.

FIG. 9A shows the activated air gun 502 depicted in the FIG. 5 surrounded by three other air guns 902-904 of an array of air guns traveling in the same direction 906. FIG. 9B shows the air guns 903 and 904 passing through the foam 702 of small air bubbles described above with reference to FIG. 7. The air bubble 506 and small air bubbles 508 create an air/water volume in close proximity to the air guns 903 and 904. The air/water volume impacts bubble oscillation of air injected by the air guns 903 and 904. As a result, acoustic energy that travels downward and away from the air guns 903 and 904 passes through the air/water volume and is subjected to unpredictable perturbations. In addition, the source ghost (i.e., surface reflected energy) created by the air guns 903 and 904 cannot be accurately estimated because the air/water volume above the air guns 903 and 904 creates unpredictable perturbations in the acoustic energy traveling upward from the air guns 903 and 904.

The effects may make it difficult to accurately determine the total three-dimensional wavefield emitted from a source with air guns activated at different times, which in turn leads to an inevitable reduction in the quality in any final seismic images. Methods and systems now described below are directed to determining a time-distributed sequence of activation times for air guns of a source. A source composed of an array of air guns is partitioned into subsets of air guns called "sub-sources." A sub-source may be composed of a single air gun, two or more air guns, or a sub-array of air guns. The sub-sources are activated according to a time-distributed sequence.

Figure 10A:
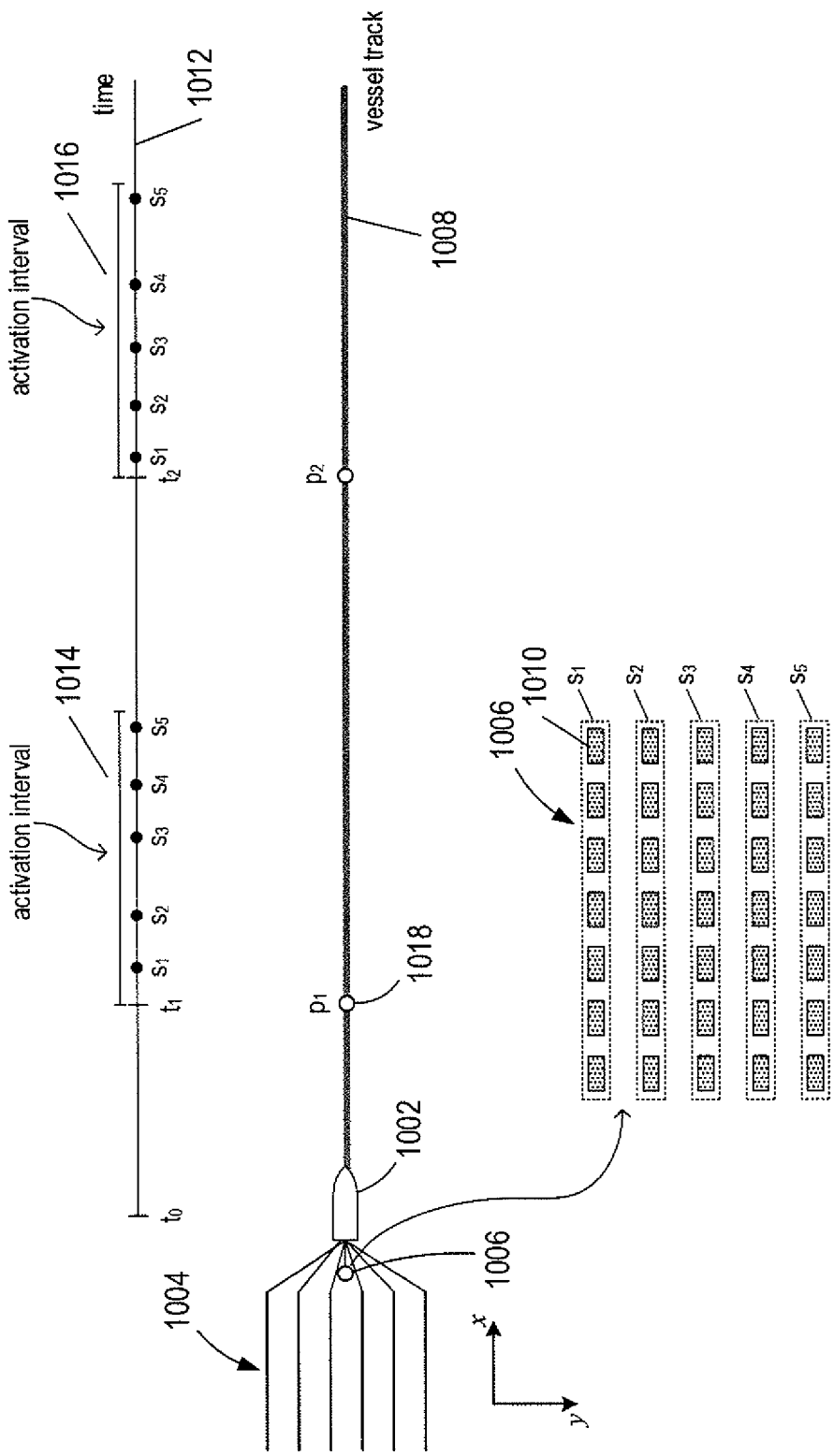
FIGS. 10A-10B show examples of activating sub-sources of a source in time-distributed sequences.

FIG. 10A shows an example of a survey vessel 1002 towing six streamers 1004 and a source 1006 in the in-line or x-direction along a vessel track 1008. In this example, the source 1006 is composed of a 5×7 array of air guns represented by shaded rectangles, such as shaded rectangle 1010. FIG. 10 also includes a time axis 1012 with start-activation times $t_i$, where i=1, 2, . . . , n. A start-activation time $t_i$ represents the start of an activation interval in which air guns of the source 1006 are activated in a time-distributed manner. For example, start-activation times $t_1$ and $t_2$ represent start times for activation intervals 1014 and 1016 in which all of the air guns of the source 1006 are activated in a time-distributed manner described below. The activation intervals may span the entire time interval between $t_1$ and $t_2$, or only a part of the interval between $t_1$ and $t_2$. Open circles, such as open circle 1018, represent source-activation locations $p_i$, where i=1, 2, . . . , n, along the vessel track 1008. The source-activation locations correspond to the start-activation times. In the example of FIG. 10, the air guns comprising the source 1006 are partitioned into five sub-sources denoted by $s_1$, $s_2$, $s_3$, $s_4$, and $s_5$. In this simple example, the time-distributed sequence is sub-source $s_1$ activated first followed by sub-source $s_2$, which is followed by $s_3$, which is followed by $s_4$, and sub-source $s_5$ activated last. Closed circles labeled $s_1$, $s_2$, $s_3$, $s_4$, and $s_5$ in the activation intervals 1014 and 1016 represents activation times of the sub-sources $s_1$, $s_2$, $s_3$, $s_4$, and $s_5$. In the example of FIG. 10A, the sub-sources are activated at random or pseudo-random activation times with respect to the start-activation times $t_1$ and $t_2$ of activation intervals. Alternatively, the sub-sources may be activated with regular activation times with respect to the start-activation time of each activation interval. The survey vessel 1002 may record in separate shot records reflected wavefields for each activation interval.

Figure 10B:
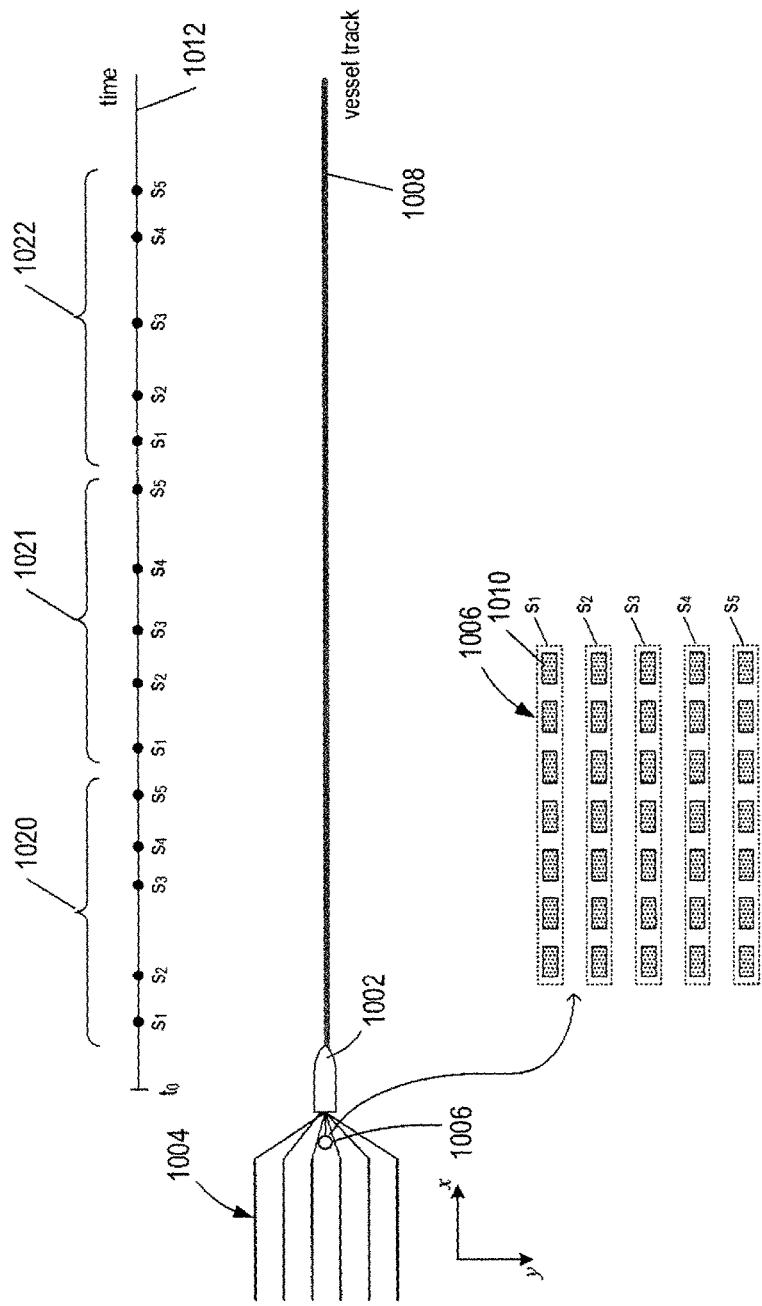

In an alternative implementation, activation-time intervals and start-activation times may be omitted. In other words, the sub-sources may be activated according to a particular sequence or ordering, but the activation times of the sub-sources are not restricted to activation-time intervals as described above with reference to FIG. 10A. FIG. 10B shows the survey vessel 1002 towing the six streamers 1004 and the source 1006 in the in-line direction along the vessel track 1008 and includes the time axis 1012. In this example, the five sub-sources $s_1$, $s_2$, $s_3$, $s_4$, and $s_5$ are activated according to the time-distributed sequence as indicated by brackets 1020-1022, but the sub-source activation times are not restricted to activation in activation intervals. As shown in FIG. 10B, after the last sub-source in the sequence has been activated, sub-source $s_5$, the sequence is repeated starting with the sub-source $s_1$. In the example of FIG. 10B, the sequential order in which the sub-sources are activated is maintained but the activation times of the sub-sources, including the activation time of the sub-source $s_1$ followed by activation time of the sub-source $s_5$, are pseudo-randomized or randomized. In another implementation, the sequential order in which the sub-sources are activated is maintained and the time intervals between activation times of the sub-sources, including the time interval between the activation time of the sub-source $s_1$ following the activation time of the sub-source $s_5$, may be fixed. In still another implementation, the sequential order in which the sub-sources are activated is maintained and the time interval between the activation times of the sub-sources may be fixed, but the activation time of the sub-source $s_1$ following the activation time of the sub-source $s_5$ may be randomized or pseudo-randomized.

Figure 11A:
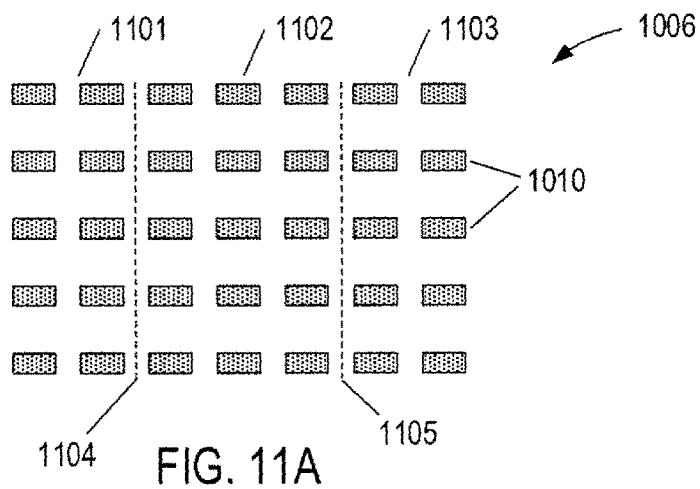
FIGS. 11A-11C show three example partitions of a source into sub-sources.
Figure 11B:
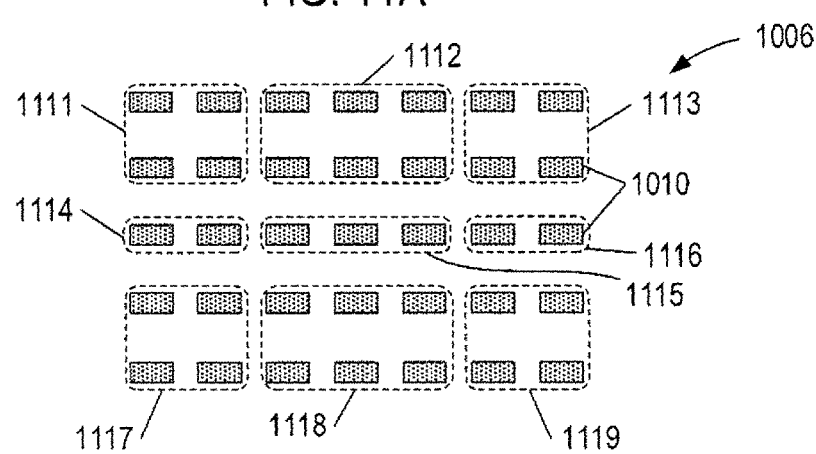
Figure 11C:
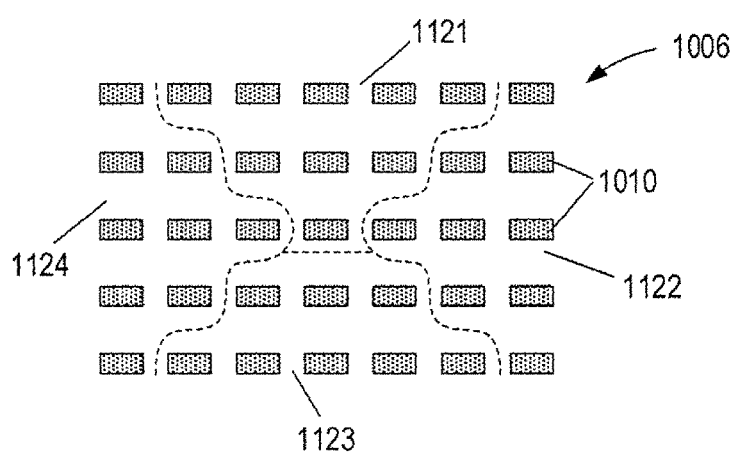

Sub-source configurations are not limited to the sub-source partition shown in FIG. 10. FIGS. 11A-11C show three example partitions of the air guns 1010 of the source 1006 into sub-sources. In FIGS. 11A-11C, dashed curves, lines, and enclosures separate different sub-sources. In FIG. 11A, the source 1006 is partitioned into sub-sources 1101-1103 separated by dashed lines 1104 and 1105. In this example, the three sub-sources are sub-arrays of the full 5×7 array of air guns comprising the source 1006. In FIG. 11B, the source 1006 is partitioned into nine sub-sources identified by dash-line enclosures 1111-1119. In FIG. 11C, the source 1006 is partitioned into four, irregularly-shaped sub-sources 1121-1124.

Figure 12A:
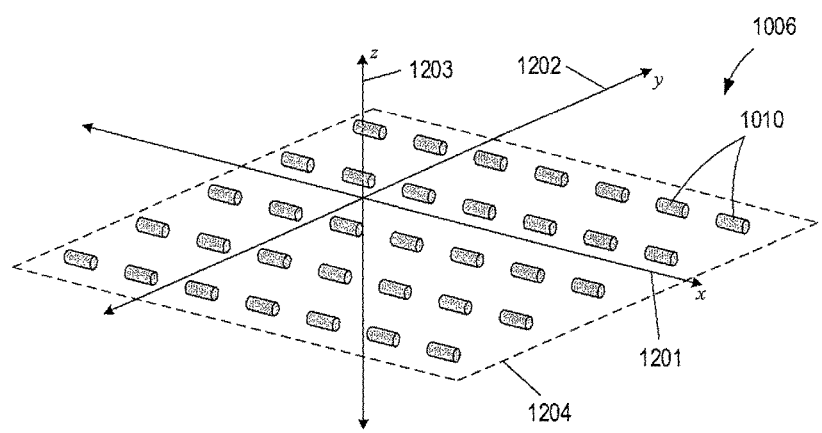
FIGS. 12A-12B show examples of sources with air guns deployed at the same depth and at different depths.
Figure 12B:
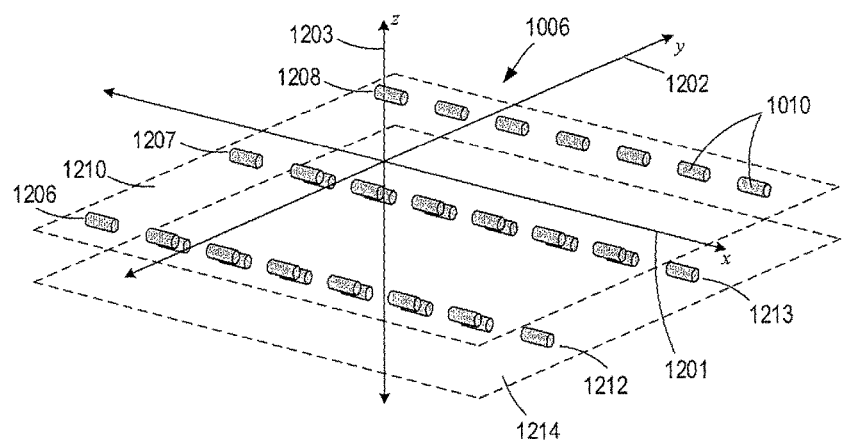

In certain implementations, the air guns comprising a source may be deployed at the same depth. In other implementations, the air guns comprising a source may be deployed at different depths. FIG. 12A shows the source 1006 with the air guns 1010 deployed at the same depths, and FIG. 12B shows the source 1006 with the air guns 1010 deployed at different depths. FIGS. 12A-12B include Cartesian coordinate axes with an x-axis 1201 that corresponding the in-line direction, a y-axis 1102 that corresponds to the cross-line direction, and a z-axis 1203 that corresponds to depth below the free-surface. In the example of FIG. 12A, the air guns 1010 lie in the same plane 1204 oriented parallel to the xy-plane at a depth below the free surface. In the example of FIG. 12B, the source 1006 is configured so that three rows 1206-1208 of air guns 1010 all lie in a first plane 1210 and two row 1212 and 1213 lie in a second plane 1214 with the planes 1210 and 1213 located at different depths and parallel to the xy-plane. In other implementations, the air guns may be deployed at a variety of different depths. For example, the plane 1204 in FIG. 12A may be rotated or tilted about an axis parallel to the y-axis 1202 such that the depths of the air guns decrease or increase in the in-line direction. Alternatively, the plane 1204 may be rotated or tilted about an axis parallel to the x-axis 1201 such that the depths of the air guns decrease or increase in the cross-line direction. In still other implementations, the air guns may all be deployed at random depths within a range of depths below the free-surface.

A time-distributed sequence determined by the methods and systems described below minimizes the chaotic effects of air in the water around the air guns of a sub-source that is next to be activated in the sequence by ensuring that: (1) the air/water volumes created by previously activated sub-sources are far away from the next sub-source to be activated and (2) that the air/water volumes created by previously activated sub-sources are outside the outside cone of emission of the next sub-source to be activated.

Methods and system may compute outer downward cones of emission for the air guns of sub-sources based on the critical angle computed as described above with reference to FIG. 2 and Equation (2). The speed of sound in the top layer of a subterranean formation may vary depending on the survey area of the subterranean formation. For example, sediment speed of sound in the top layer of a subterranean formation to be surveyed may range from about 1600-2500 m/s. Alternatively, methods and systems may compute outer downward cones of emission for the air guns of sub-sources based on a fixed or defined cone angle that is generally suitable for most subterranean formations when sediment speed of sound in the top layer of a subterranean formation is unknown or cannot be determined.

Figure 13:
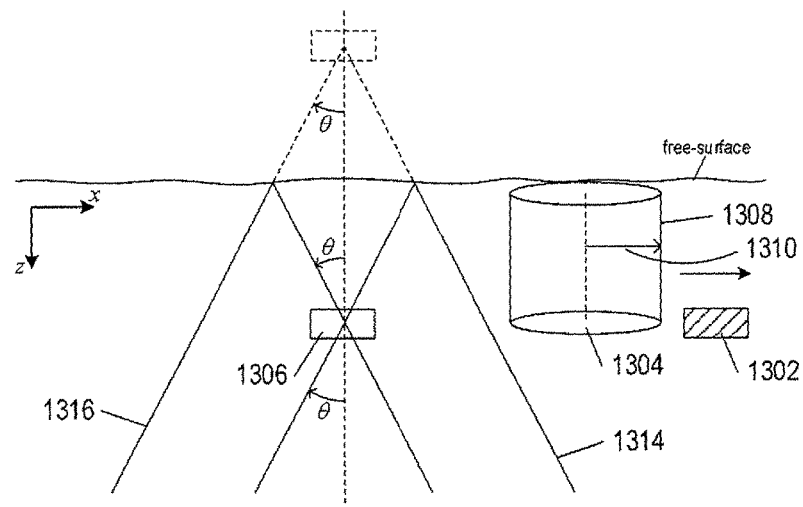
FIG. 13 shows a side elevation view two sub-sources with no air/water contamination of a source wavefield.
Figure 14:
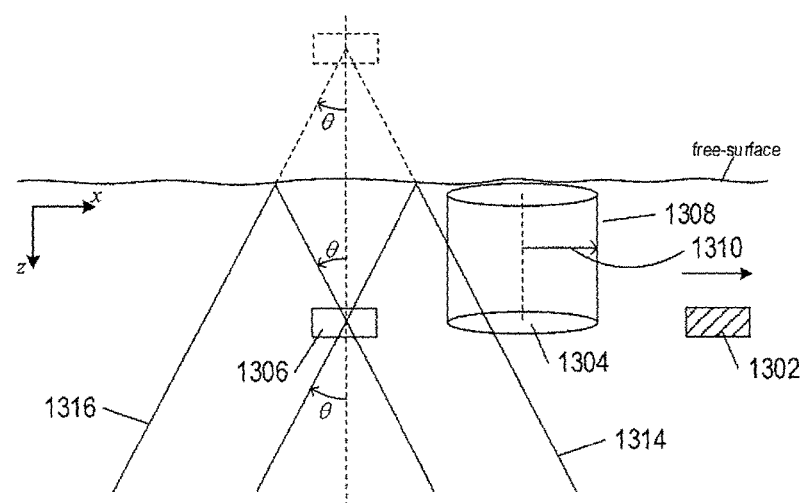
FIG. 14 shows a side elevation view of two sub-sources with air/water contamination of a source wavefield.

FIGS. 13-14 shows a side elevation view of two air guns of the same source. Hash-marked rectangle 1302 represents a previously activated air gun that released air into the water at point 1304 and unshaded rectangle 1306 represents a next to be activated air gun. A cylinder 1308 represents an air/water volume created by the previously activated air gun 1302. As explained above with reference to FIG. 7, the air/water volume 1308 expands outward from the point of activation 1304 and lingers for a period of time before gradually rising to the free-surface as a column of air bubbles. The radius 1310 of the air/water volume 1308 represents the lateral extent to which the air/water volume 1408 expands after air is injected into the water. The up-ward motion and radial extent of the air/water volume 1308 may be estimated from field observations. The radius 1310 of the air/water volume may range from about 0.4 meters to about 2 meters, depending on the depth of the air gun and volume of the air chamber volume of the air gun. A location for the next be activated air gun 1306 may be computed from the position of the air gun 1306 in the source array, the vessel speed, and the current time:

$$x'_1 = r(t-t_0) + x'_0 \quad (3a)$$

$$y'_1 = r(t-t_0) + y'_0 \quad (3b)$$

where $x'_0$ and $y'_0$ represent coordinate location of a next to be activated air gun 1306 at the time of activation of the previously activated air gun;

$x'_1$ and $y'_1$ represent coordinate location of the next to be activated air gun 1306 at the current time;

r represents vessel speed;

$t_0$ represents activation time of the previously activate air gun; and t represents current time.

An outside cone of emission for the next be activated air gun 1306 may be estimated or computed based on formation surface properties as described above with reference to FIG. 2. For example, the cone angle $\theta$ of the outside cone of emission defined by lines 1314 and 1316 for the next be activated air gun 1306 may be set to an angle within a range of cone angles. The range of cone angles may range from a small cone angle of about 50 degrees to a large cone angle of about 70 degrees. The small cone angle of about 50 degrees corresponds to a formation surface sediment speed of sound of about 2000 m/s and the 70 degrees corresponds to a formation surface sediment speed of sound of about 1600 m/s. In alternative implementations when the formation surface sediment speed of sound is known, the cone angle $\theta$ may be computed as the critical angle according to the law of refraction given by Equation (2). The example of FIG. 13 represents the case where the computed air/water volume 1308 would not contaminate (i.e., intersect with) portions of a source wavefield traveling in an outside cone of emission defined by lines 1314 and 1316. As a result, the air gun 1306 may be activated. By contrast, the example of FIG. 14 represents the case where the air/water volume 1308 would contaminate portions of a source wavefield traveling in the outside cone of emission defined by lines 1314 and 1316. As a result, the air gun 1306 is not activated.

Figure 15:
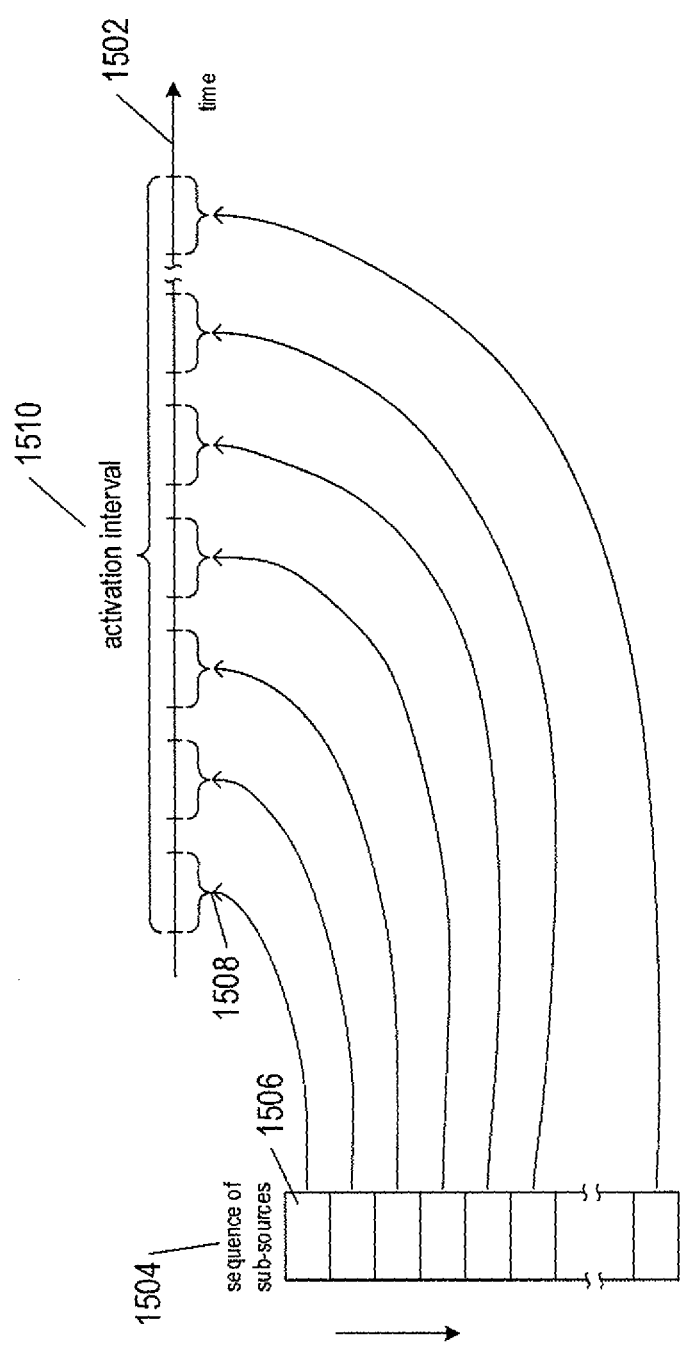
FIG. 15 shows an example of a sequence of sub-sources used to time activation of sub-sources of a source in an activation interval.

A data table listing a sequence of sub-sources may be used as sub-source timing sequence to order activation of actual sub-sources of a source within an activation interval. FIG. 15 shows an example of a sequence of sub-sources used to time activation of sub-sources of a source in an activation interval. Activation time intervals are described above with reference to FIG. 10. Horizontal axis 1502 represents time and data table 1504 represents a sequence of sub-sources of a source. Each data entry, such as data entry 1506, in the data table 1504 represents a sub-source, which may be an air gun, two or more air guns, or a sub-array of air guns. In the example of FIG. 15, the sub-sources are activated in time windows, such as time window 1508, of an activation interval 1510. For example, the sub-source represented by data entry 1506 is activated in time window 1508. The air guns of a sub-source may be activated simultaneously at a particular time of a time window. In alternative implementations, certain sub-sources may be activated simultaneously in corresponding time windows while other sub-sources may be activated in a pseudorandom manner in other corresponding time windows.

Figure 16:
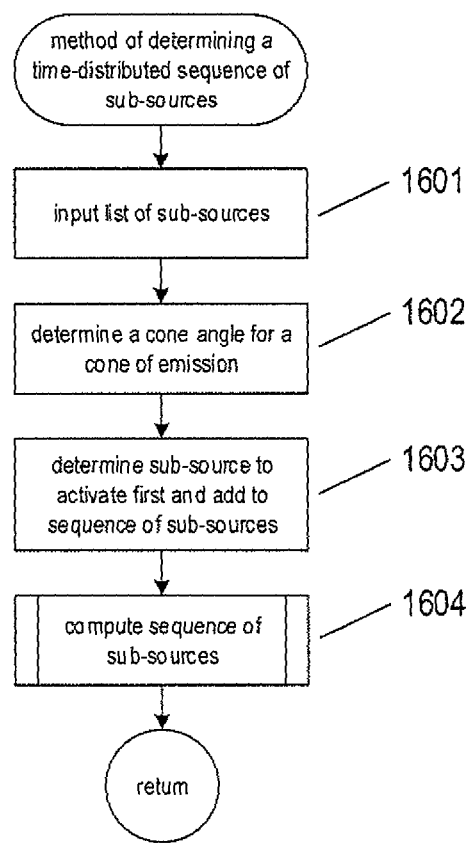
FIG. 16 shows a flow diagram of a method of determining a time-distributed sequence of sub-sources.

FIG. 16 shows a flow diagram of a flow diagram of a method of determining a time-distributed sequence of sub-sources. In block 1601, a list of sub-sources is received as input. The list of sub-sources may be generated by partitioning a source into sub-sources as described above with reference to FIGS. 10 and 11. In block 1602, a cone angle for air guns of the source is determined as described above with reference to FIGS. 13-14. In block 1603, a sub-source of the list of sub-sources is determined for first activation and added to a sequence of sub-sources. For example, the sub-source may be one of many sub-sources located farthest away from the direction the source is to be towed in a body of water. In block 1604, a routine "compute sequence of sub-sources" is called to generate a time-distributed sequence of sub-sources.

Figure 17:
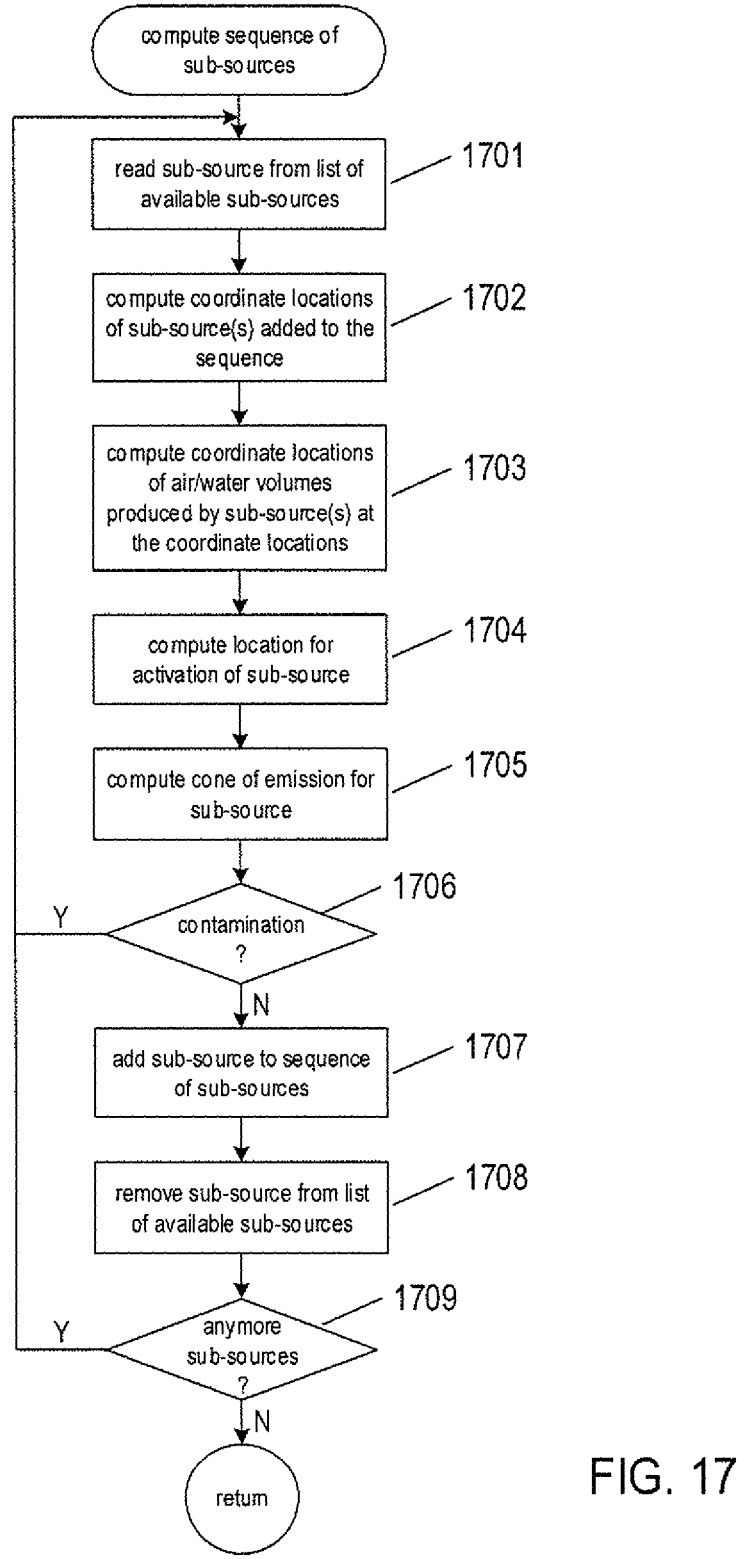
FIG. 17 shows a flow-control diagram of the routine "compute sequences of sub-sources" called in the flow diagram in FIG. 16.

FIG. 17 shows a flow-control diagram of the routine "compute sequences of sub-sources" called in block 1604 of the flow diagram in FIG. 16. The control-flow diagram in FIG. 17 represents a technique of forming a time-distributed sequence of sub-sources. In block 1701, a sub-source listed next in the list of sub-sources is read. In block 1702, the geometry of previously activated sub-sources is determined by computing the coordinate locations of air guns comprising the sub-sources already added to the sequence based on the known layout and coordinate locations of the air guns comprising the sub-sources. Sub-sources already added to the sequence represents sub-sources that would be activated before a next to be added sub-source to the sequence. In block 1703, coordinate locations of air/water volumes that would be produced by sub-sources already added to the sequence are computed based on the coordinate locations of the sub-sources. The up-ward motion of the air-bubbles in water for each of the air guns of sub-sources already added to the sequence may be estimated as cylinders as described above with reference to FIGS. 13 and 14. In block 1704, a location for the sub-source to be activated next is computed from the position of the sub-source in the source array, the vessel speed, and the current time, as described above with reference to Equations (3a)-(3b). In block 1705, outside cones of emission are computed for air guns of the sub-source as described above with reference to FIGS. 13 and 14. When an air/water volume of air guns of sub-source already added to the sequence intersects an outside cone of emission of an air gun of a next sub-source to be added to the sequence, then contamination occurs as described above with reference to FIG. 14. In decision block 1706, when contamination is determined, the sub-source is not added to the sequence and control flows back to block 1701. Otherwise, when no contamination is determined, control flows to block 1707. In block 1707, the sub-source is added to the sequence of sub-sources. In block 1708, the sub-source is removed from the list of sub-sources. In decision block 1709, when more sub-sources are listed in the list of sub-sources, control flows back to block 1701.

Figure 18:
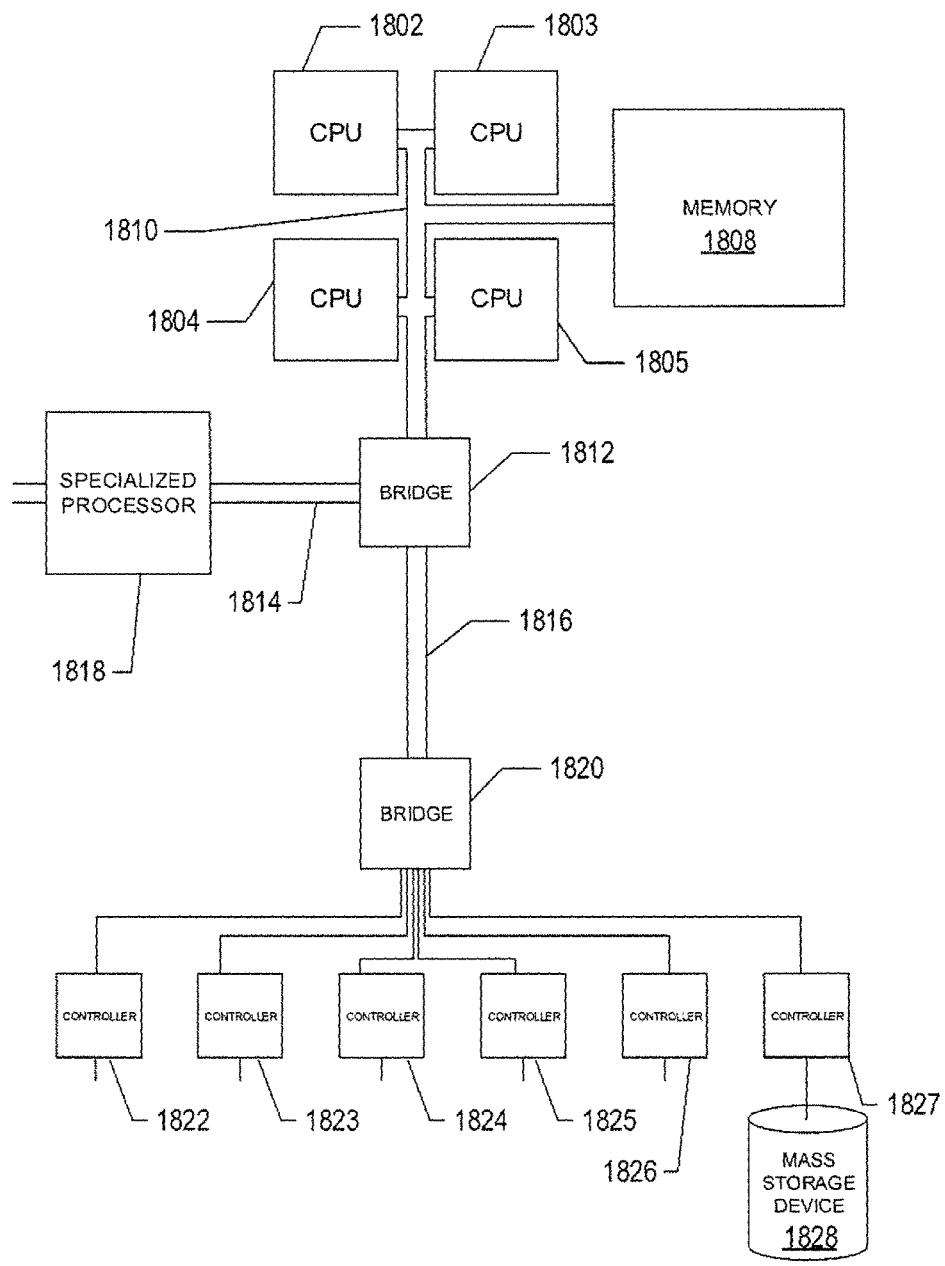
FIG. 18 shows an example of a generalized computer system that executes efficient methods of computing a timing sequence of sub-sources.

FIG. 18 shows an example of a generalized computer system that executes efficient methods of computing a timing sequence of sub-sources. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a data-storage device, including electronic memory, optical or magnetic disk drive, USB drive, flash memory and other such data-storage device. The computer-readable medium 1828 can be used to store machine-readable instructions that encode the computational methods described above and can be used to store encoded data, during store operations, and from which encoded data can be retrieved, during read operations, by computer systems, data-storage systems, and peripheral devices.

The method described above may be implemented in real time prior to conducting a marine survey. The seismic data obtained from activating sub-sources of a source in accordance with a timing sequence of sub-sources forms a geophysical data product indicative of certain properties of a subterranean formation. The geophysical data product may include processed seismic geophysical data and may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the above description of the described implementations is provided to enable any person skilled in the art to make or use the present disclosure. Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Thus, the present disclosure is not intended to be limited to the embodiments shown herein but is to be accorded the widest scope consistent with the principles and novel features disclosed herein.

The invention claimed is:

1. In a process for generating an image of a subterranean formation located below a body of water, the specific improvement comprising:
   determining a cone angle of a cone of emission for each sub-source of the source;
   determining a time-distributed sequence in which to activate the sub-sources of the source based on the cone angles and locations for air/water volumes in the body of water to be generated by the sub-sources, the time-distributed sequence to prevent air generated by any previously activated sub-source from contaminating a source wavefield to be generated by a next to be activated sub-source of the sequence;
   activating the sub-sources of the source in accordance with the time-distributed sequence to generate acoustic signals in the body of water above the subterranean formation;
   recording seismic data in a data storage device, the recorded seismic data generated by the receivers that measure wavefields produced by the subterranean formation in response to the acoustic signals generated by the sub-sources; and
   generating an image of the subterranean information based at least in part on the recorded seismic data, thereby increasing signal-to-noise ratio in the recorded seismic data and quality of the image.

2. The process of claim 1, wherein determining the cone angle for each sub-source further comprises setting the cone angle to a cone angle in a range of cone angles.

3. The process of claim 1, wherein determining the cone angle for each sub-source further comprises:
   computing a critical angle for a subterranean formation based on a contrast between speed of acoustic energy in a body of water above the subterranean formation and speed of acoustic energy in a top surface layer of the subterranean formation; and
   setting the cone angle equal to the critical angle.

4. The process of claim 1, wherein the cone of emission of each sub-source is a downward directed cone centered on virtual air guns that correspond to the air guns of each sub-source.

5. The process of claim 1, wherein determining the time-distributed sequence further comprises:
   adding a first sub-source to the time-distributed sequence of sub-sources, the first sub-source obtained from a list of sub-sources that partition the source into the sub-sources;
   for each next sub-source in the list of the sub-sources that partition the source,
      computing coordinate locations of air guns of sub-sources already added to the sequence;
      computing air/water volumes that would be produced at the coordinate locations by the sub-sources already added to the sequence;
      computing location of the next sub-source based on the vessel speed;

computing an outside cone of emission centered above air guns of the next sub-source; and when the air/water volumes do not contaminate the outside cones of emission, adding the next sub-source to the sequence, and removing the next sub-source from the list of the sub-sources that partition the source.

6. The process of claim 5, wherein adding the first sub-source to the sequence of sub-sources further comprises identifying a sub-source located farthest away from a direction the source is to travel.

7. The process of claim 1 executed on a programmable computer programmed to execute the method.

8. The process of claim 1 further comprising storing the sequence of sub-sources in one or more data-storage devices.

9. A computer system for generating an image of a subterranean formation comprising:
one or more processors;
one or more data-storage devices; and
a routine stored in one or more of data-storage devices that when executed by the one or more processors controls the system to carry out
determining a cone angle of a cone of emission for each sub-source of a source, each sub-source comprising one or more air guns of the source;
determining a time-distributed sequence in which to activate the sub-sources of the source based on the cone angles and locations for air/water volumes in the body of water to be generated by the sub-sources, the time-distributed sequence to prevent air generated by any previously activated sub-source from contaminating a source wavefield to be generated by a next to be activated sub-source of the sequence;
activating the sub-sources of the source according to the time-distributed sequence in a body of water above a subterranean formation;
recording seismic data in a data storage device, the recorded seismic data generated by the receivers that measure wavefields produced by the subterranean formation in response to the acoustic signals generated by the sub-sources; and
generating an image of the subterranean information based at least in part on the recorded seismic data.

10. The system of claim 9, wherein determining the cone angle for each sub-source further comprises setting the cone angle to a cone angle in a range of cone angles.

11. The system of claim 9, wherein determining the cone angle for each sub-source further comprises:
computing a critical angle for a subterranean formation based on a contrast between speed of acoustic energy in a body of water above the subterranean formation and speed of acoustic energy in a top surface layer of the subterranean formation; and
setting the cone angle equal to the critical angle.

12. The system of claim 9, wherein the cone of emission of each sub-source is a downward directed cone centered on virtual air guns that correspond to the air guns of each sub-source.

13. The system of claim 9, wherein determining the time-distributed sequence further comprises:
adding a first sub-source to the time-distributed sequence of sub-sources, the first sub-source obtained from a list of sub-sources that partition the source into the sub-sources;
for each next sub-source in the list of the sub-sources that partition the source,
computing coordinate locations of air guns of sub-sources already added to the sequence;
computing air/water volumes that would be produced at the coordinate locations by the sub-sources already added to the sequence;
computing location of the next sub-source based on the vessel speed;
computing an outside cone of emission centered above air guns of the next sub-source; and
when the air/water volumes do not contaminate the outside cones of emission,
adding the next sub-source to the sequence, and removing the next sub-source from the list of the sub-sources that partition the source.

14. The system of claim 13, wherein adding the first sub-source to the sequence of sub-sources further comprises identifying a sub-source located farthest away from a direction the source is to travel.

15. The system of claim 9 further comprising a survey vessel to tow the source through a body of water.

16. The system of claim 9 further comprises activating air guns the source in accordance with the time-distributed sequence.

17. A non-transitory computer-readable medium having machine-readable instructions encoded thereon for enabling one or more processors of a computer system to generate an image of a subterranean formation by performing the operations comprising:
determining a cone angle of a cone of emission for each sub-source of a source, each sub-source comprising one or more air guns of the source;
determining a time-distributed sequence in which to activate the sub-sources of the source based on the cone angles and locations for air/water volumes in the body of water to be generated by the sub-sources, the time-distributed sequence to prevent air generated by any previously activated sub-source from contaminating a source wavefield to be generated by a next to be activated sub-source of the sequence;
activating the sub-sources of the source according to the time-distributed sequence to generate acoustic signals in a body of water above a subterranean formation;
recording seismic data in a data storage device, the recorded seismic data generated by the receivers that measure wavefields produced by the subterranean formation in response to the acoustic signals generated by the sub-sources; and
generating an image of the subterranean information based at least in part on the recorded seismic data.

18. The computer-readable medium of claim 17, wherein determining the cone angle for each sub-source further comprises setting the cone angle to a cone angle in a range of cone angles.

19. The computer-readable medium of claim 17, wherein determining the cone angle for each sub-source further comprises:
computing a critical angle for a subterranean formation based on a contrast between speed of acoustic energy in a body of water above the subterranean formation and speed of acoustic energy in a top surface layer of the subterranean formation; and
setting the cone angle equal to the critical angle.

20. The computer-readable medium of claim 19, wherein adding the first sub-source to the sequence of sub-sources further comprises identifying a sub-source located farthest away from a direction the source is to travel.

21. The computer-readable medium of claim 17, wherein the cone of emission of each sub-source is a downward directed cone centered on virtual air guns that correspond to the air guns of each sub-source.

22. The computer-readable medium of claim 17, wherein determining the time-distributed sequence further comprises:
  adding a first sub-source to the time-distributed sequence of sub-sources, the first sub-source obtained from a list of sub-sources that partition the source into the sub-sources;
  for each next sub-source in the list of the sub-sources that partition the source,
    computing coordinate locations of air guns of sub-sources already added to the sequence;
    computing air/water volumes that would be produced at the coordinate locations by the sub-sources already added to the sequence;
    computing location of the next sub-source based on the vessel speed;
    computing an outside cone of emission centered above air guns of the next sub-source; and
    when the air/water volumes do not contaminate the outside cones of emission,
      adding the next sub-source to the sequence, and
      removing the next sub-source from the list of the sub-sources that partition the source.

23. A method for manufacturing a geophysical data product, the method comprising:
  determining a cone angle of a cone of emission for each sub-source of the source, each sub-source comprising one or more air guns of the source;
  adding a first sub-source to a time-distributed sequence of sub-sources, the first sub-source obtained from a list of sub-sources that partition the source into the sub-sources;
  determining a time-distributed sequence in which to activate the sub-sources of the source based on the cone angle;
  activating the sub-sources of the source according to the time-distributed sequence to generate acoustic signals in a body of water above a subterranean formation;
  recording a wavefield emitted from the subterranean formation in response to the acoustic signals generated by the sub-sources;
  generating an image of the subterranean information based at least in part on the recorded seismic data; and
  recording the image of the subterranean formation in a non-transitory computer-readable medium.

24. The method of claim 23, wherein determining the cone angle for the air guns further comprises setting the cone angle to a cone angle in a range of cone angles.

25. The method of claim 23, wherein determining the cone angle further comprises:
  computing a critical angle for a subterranean formation based on a contrast between speed of acoustic energy in a body of water above the subterranean formation and speed of acoustic energy in a top surface layer of the subterranean formation; and
  setting the cone angle equal to the critical angle.

26. The method of claim 23, wherein the cone of emission of each sub-source is a downward directed cone centered on virtual air guns that correspond to the air guns of each sub-source.

27. The method of claim 23, wherein determining the time-distributed sequence further comprises:
  adding a first sub-source to the time-distributed sequence of sub-sources, the first sub-source obtained from a list of sub-sources that partition the source into the sub-sources;
  for each next sub-source in the list of the sub-sources that partition the source,
    computing coordinate locations of air guns of sub-sources already added to the sequence;
    computing air/water volumes that would be produced at the coordinate locations by the sub-sources already added to the sequence;
    computing location of the next sub-source based on the vessel speed;
    compute an outside cone of emission centered above air guns of the next sub-source; and
    when the air/water volumes do not contaminate the outside cones of emission
      adding the next sub-source to the sequence, and
      removing the next sub-source from the list of the sub-sources that partition the source.

28. The method of claim 27, wherein adding the first sub-source to the sequence of sub-sources further comprises identifying a sub-source located farthest away from a direction the source is to travel.

29. The method of claim 23 wherein activating the sub-sources of the source according to the time-distributed sequence and recording a wavefield emitted from the subterranean formation further comprise:
  activating the sub-sources according to the time-distributed sequence in activation intervals as the survey vessel tows the source through a body of water; and
  recording the wavefield emitted from the subterranean formation in shot records for each activation interval.

30. The method of claim 29, further comprising performing geophysical analysis onshore on the geophysical data product.

31. The method of claim 23 wherein activating the sub-sources of the source according to the time-distributed sequence and recording a wavefield emitted from the subterranean formation further comprise:
  repeatedly activating the sub-sources according to the time-distributed sequence; and
  continuously recording the wavefield emitted from the subterranean formation.

* * * * *